United States Patent [19]

Letaief et al.

[11] Patent Number: 5,960,032
[45] Date of Patent: Sep. 28, 1999

[54] HIGH SPEED DATA TRANSMISSION USING EXPANDED BIT DURATIONS IN MULTIPLE PARALLEL CODED DATA STREAMS

[75] Inventors: Khaled Ben Letaief, Taikoo Shing; Justin C-I Chuang; Ross D. Murch, both of Clearwater Bay, all of The Hong Kong Special Administrative Region of the People's Republic of China

[73] Assignee: The Hong Kong University of Science & Technology, The Hong Kong Special Administrative Region of the People's Republic of China

[21] Appl. No.: 08/531,012

[22] Filed: Sep. 20, 1995

[51] Int. Cl.⁶ .................................................. H04B 1/707
[52] U.S. Cl. ............................................................. 375/206
[58] Field of Search ................................... 375/206, 260, 375/267; 370/203, 208, 209, 335, 342, 441, 479

[56] References Cited

U.S. PATENT DOCUMENTS

| | | |
|---|---|---|
| 3,518,547 | 6/1970 | Filipowsky ............................ 370/208 |
| 5,239,541 | 8/1993 | Murai ...................................... 375/267 |
| 5,373,502 | 12/1994 | Turban .................................... 370/441 |
| 5,414,734 | 5/1995 | Marchetto et al. .................... 375/267 |
| 5,442,625 | 8/1995 | Gitlin et al. ........................... 370/342 |
| 5,467,367 | 11/1995 | Izumi et al. ........................... 375/206 |
| 5,521,937 | 5/1996 | Kondo et al. .......................... 375/206 |
| 5,544,167 | 8/1996 | Lucas et al. ........................... 370/342 |
| 5,555,268 | 9/1996 | Fattouche et al. ..................... 375/206 |
| 5,577,022 | 11/1996 | Padovani et al. ...................... 370/335 |
| 5,583,851 | 12/1996 | Kato et al. ............................. 375/206 |
| 5,615,227 | 3/1997 | Schumacher, Jr. et al. ............ 375/206 |

*Primary Examiner*—Don N. Vo
*Attorney, Agent, or Firm*—Burns, Doane, Swecker & Mathis, L.L.P.

[57] ABSTRACT

High-rate bit transmitted data is serial to parallel converted into low-rate bit streams in a similar fashion to multicarrier or multitone modulation. However, in contrast to the multicarrier method, each low-rate bit stream is modulated using direct-sequence spread-spectrum. By selecting the processing gain properly the total required bandwidth will be of the same order as the original high-rate data stream, thereby gaining the inherent benefit of multipath rejection without expanding the bandwidth of the original high-rate stream.

15 Claims, 7 Drawing Sheets

HIGH SPEED DATA TRANSMISSION USING EXPANDED BIT DURATIONS IN MULTIPLE PARALLEL CODED DATA STREAMS

FIELD OF THE INVENTION

This invention relates to a method for the high speed transmission of data, in particular in wireless personal communications.

BACKGROUND OF THE INVENTION

During the last decade, the telecommunication industry has produced an explosion of wireless technology. This growth, together with recent developments in hardware miniaturization, has opened a new dimension to future wireless networks whose ultimate goal is to provide universal personal communications. To achieve such an objective, the next generation personal communications networks will need to be able to support a very high level of user traffic along with a wide range of high-quality services with varying bit rates. These future services are likely to include video and LAN applications which require high speed transmission rates of several Mbps. However, the ability to achieve high bit rates at low error rates over wireless channels is severely restricted by the propagation characteristics of the wireless environment where signals typically arrive at the receiver via a scattering mechanism resulting in multiple propagation paths with different time delays, attenuation, and phasors. This causes a spread in delay times which imposes a limit on the maximum transmission rate. These restrictions manifest themselves as intersymbol interference (ISI) which leads to the introduction of an irreducible error floor. Therefore, without countermeasures to mitigate the delay spread impairments the information rate is usually limited to be under 1 Mbps when user mobility prevents steady line-of-sight conditions.

PRIOR ART

One possible solution, which has received a lot of attention recently, is multicarrier modulation or multitone modulation in which the transmitted data is divided into several interleaved bit streams which are then used to modulate several sub-carriers, see for example:

L. J. Cimini, Jr., "Analysis and simulation of a digital mobile-channel using orthogonal frequency division multiplexing," IEEE Trans. Commun., COM-33, No. 7, pp. 665–675, July 1985; I. Kalet, "The multitone channel," IEEE Trans. Commun., Vol. COM-37, No.2, pp. 119–124, February 1989; and J. A. C. Bingham, "Multicarrier modulation for data transmission: An idea whose time has come," IEEE Commun. Mag., pp. 5–14, May 1990.

However, such an approach requires equalization in the frequency domain which can prove to be quite complex with high transmission rates (of the order of 10 Mbps or higher for instance) and time-varying wireless channels. In addition, in multicarrier modulation a training waveform is often sent through the channel. The channel information is then fed back from the receiver to the transmitter so that the total transmitted power for the various sub-channels can be allocated. To do so, however, can be quite complicated. In fact, the optimum power distribution for each sub-channel should be calculated by a "water-pouring" information-theoretic approach similar to that of R. G. Gallagher "Information Theory and Reliable Communications" Wiley, N.Y. 1968. This again requires a complex system whose performance degrades significantly if the channel feedback information is in error. The time-varying nature of the channel of wireless channels further requires constant update of this complicated process. An alternative approach is to send sub-carrier pilots along with the transmitted information to assist phase and amplitude equalization in multicarrier modulation. However, it should be noted that this reduces the spectrum efficiency.

Another key advantage of multicode modulation is its ability to use interference cancellation as an effective technique for improving the overall system performance. Indeed, because of the special structure of the multicode modulation method there is only one channel for all data streams. Thereby, it is only necessary to estimate the channel parameters once which can be done for instance by allocating a pilot channel for that purpose. (Note that if pilot signals are to be used in multicarrier modulation, then multiple pilot signals along with multiple channel estimations will be required, thereby, making the system architecture quite complex.) In addition, in the multicode modulation method the signature sequences of all the data streams are known. Hence, it follows that one can use the pilot signal to estimate the channel parameters. These parameters can then be used as an effective means for cancelling the interference among the sub-channels. Thereby, significantly improving the overall system performance.

SUMMARY OF THE INVENTION

According to the present invention there is provided a method for the high speed transmission of data in a wireless communication system comprising, dividing a high-rate data stream into a plurality of parallel low-rate bit streams, wherein each said low-rate bit stream is modulated using direct-sequence spread spectrum as a single carrier.

The choice of signature sequences or codes is crucial because these codes must be able to separate the interference between the low-rate bit streams and their multipath duplicates. If both objectives in the code design can be achieved then the system sensitivity may be reduced to delay spread because of the spreading of the signaling interval and also take advantage of the inherent multipath rejection benefit without spreading the original bandwidth of the transmitted signal. As a result, the proposed method has the advantage of being more robust to fading and multipath problems than multicarrier modulation.

Traditionally, PN sequences such as m-sequences, Kasami sequences, or Gold codes have been used in spread-spectrum multiple access communications to separate the multiple users. However, in the method of the present invention the low-rate data streams are transmitted synchronously. As a result orthogonal sequences, such as Walsh codes, which have zero cross-correlations when they are time synchronized, may be employed. However, multipath delays can introduce significant non-zero cross-correlations between orthogonal codes and therefore an alternative choice of signature sequence may be more appropriate.

A preferred signature sequence may comprise a combination of orthogonal codes and PN sequences. A particularly preferred possibility is for the signature sequence of each low-rate bit streams to be multiplied by the same PN code and then separated by different orthogonal sequence. By means of this arrangement the randomness of the orthogonal codes is increased while at the same time their zero cross-correlation property is maintained at zero time delay.

Preferably each said low-rate bit streams is subject to a processing gain of the order of the number of said low-rate bit streams. This makes it possible to obtain high-rate DS spread spectrum modulation within the bandwidth of the original high-rate transmission stream while maintaining the advantages of DS spread spectrum such as multi-path rejection.

BRIEF DESCRIPTION OF THE DRAWINGS

An embodiment of the invention will now be described by way of example and with reference to the accompanying drawings, in which.

DETAILED DESCRIPTION OF PREFERRED EMBODIMENT SYSTEM DESCRIPTION

Figure 1:
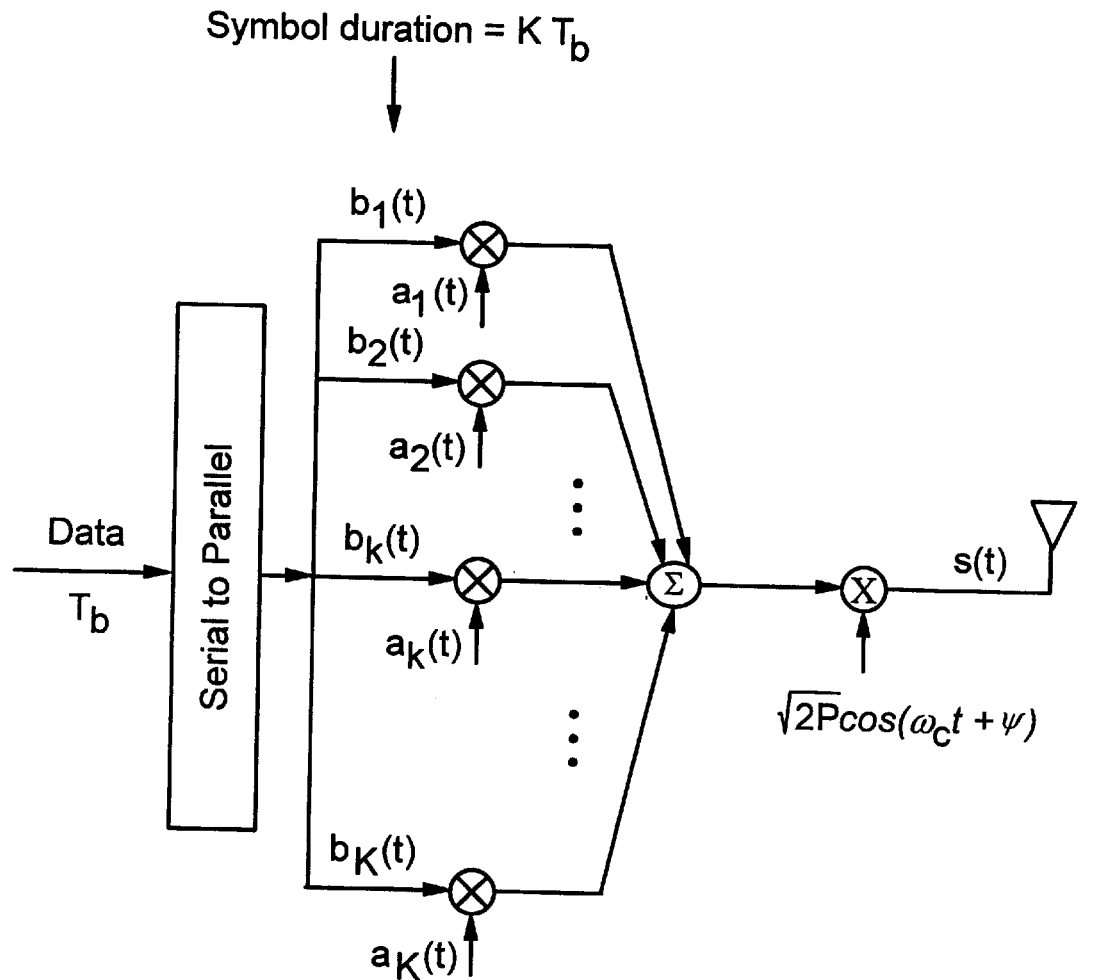
FIG. 1 illustrates schematically the method of data transmission according to an embodiment of the present invention.
Figure 1:
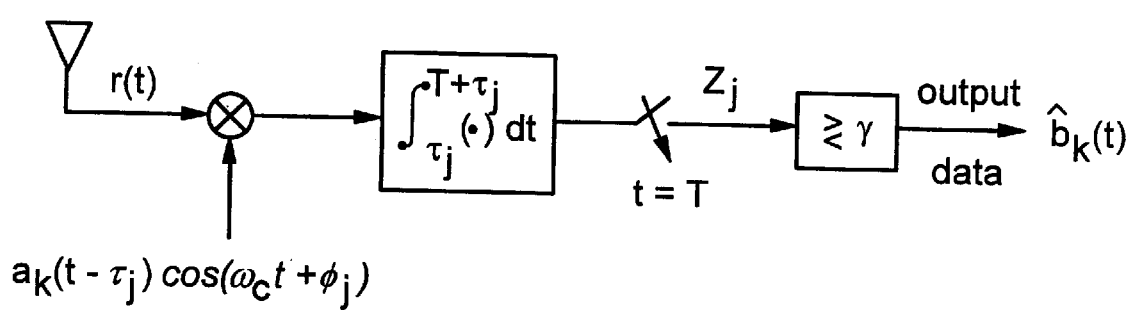

The proposed multicode modulation system is shown in FIG. 1. The incoming data bits with bit duration $T_b$ are serial-to-parallel converted into K parallel bit streams with symbol duration $T=KT_b$ in a similar fashion to multitone modulation. After the serial-to-parallel conversion, the symbols on each low-rate branch are modulated using DS spread-spectrum modulation in which the processing gain for each low-rate stream is of the order of K. Consequently, it is possible to achieve high-rate DS spread spectrum modulation within the bandwidth of the original high-rate transmission stream while maintaining the advantages of DS spread-spectrum such as multipath rejection. Furthermore, each of the DS spread-spectrum modulated low-rate streams passes through exactly the same wireless channel. As a result, power control will not be an issue as it is for multiple access spread-spectrum systems. This common wireless channel also implies that the received delay characteristics will be identical for all low-rate data streams. Therefore, this makes the receiver design less intricate. For example, if a Rake receiver is required then the delay path search circuitry need only be implemented once rather than repeatedly for each individual low-rate stream.

In order to analyze the performance of the multicode modulation technique shown in FIG. 1 some definitions and notation need to be introduced. Specifically, let $s_k(t)$ denote the transmitted signal for the kth data stream. Then $$s_k(t) = \sqrt{2P}\, b_k(t) a_k(t) \cos(\omega_c t + \varphi) \quad (1)$$

where P is the signal power, $\omega_c$ is the carrier frequency, and $\psi$ is the carrier phase. Likewise, $$b_k(t) = \sum_{j=-\infty}^{\infty} b_j^{(k)} p_T(jT, (j+1)T) \quad (2)$$

is the binary data signal, and $$a_k(t) = \sum_{j=-\infty}^{\infty} a_j^{(k)} p_T(jT_c, (j+1)T_c) \quad (3)$$

is the signature sequence signal with $p_T(t_1, t_2)$ being a unit rectangular pulse on $[t_1, t_2)$, $b_j^{(k)} \in \{-1,1\}$ where $\Pr(b_j^{(k)}=-1)=\Pr(b_j^{(k)}=1)=1/2$, and the kth stream's code sequence $a_j^{(k)} \in \{-1,1\}$ with $a_j^{(k)}=a_{j+N}^{(k)}$ for all j and k and for some integer N. The integer N is the minimum period of the spreading sequence. The chip length $T_c$ will be assumed to be given by $T_c=T/N$ where T is the symbol interval duration. Hence, there is one signature sequence $a_k=(a_0^{(k)}, a_1^{(k)}, \ldots, a_{N-1}^{(k)})$ per data symbol.

A multipath Rayleigh-fading channel having a slow fading rate compared to the symbol rate may be assumed, so that the channel random parameters do not change significantly over several consecutive symbol intervals. It may also be assumed that the channel consists of a fixed number of faded paths. Specifically, the complex lowpass equivalent impulse response of the channel is given by $$h(t) = \sum_{l=1}^{L} \beta_l \delta(t - \tau_l) e^{j\gamma_l} \quad (4)$$

where L is the number of paths (A good approximation for L is $L=\lfloor \Delta_m/T_c \rfloor +1$ where $\Delta_m$ is the maximum delay difference), and βl, τl, and γl are the lth path gain, delay, and phase for the kth data stream, and $i=\sqrt{-1}$. Throughout, it may be assumed that for each l that the path phase of the received signal φl, given by $(\omega_c \tau l + \gamma l)$, to be an independent random variable uniformly, distributed over [0,2π]. The path gains βl will be assumed to be independent Rayleigh random variables.

A useful function which characterizes a multipath channel is the "power delay profile"

$$p(t) \triangleq E[|h(t)|^2]. \quad (5)$$

This function is important since it can provide a key parameter; namely, the (rms) delay spread Δ which is defined as the square root of the second central moment. That is, $$\Delta = \sqrt{\frac{\int (t-\mu_d)^2 p(t) dt}{\int p(t) dt}} \quad (6)$$

where the average delay $\mu_d$ is given by $$\mu_d = \frac{\int t\, p(t) dt}{\int p(t) dt}.$$

It turns out that the bit error rates (BERs) for transmission through a multipath channel are strongly dependent on the normalized rms delay spread which is defined as $$d=\Delta/T \quad (7)$$

where we recall that T is the symbol period. In fact, d must be significantly smaller than unity in order to prevent excessive irreducible BERs due to ISI in a conventional (K=1) non-equalized modulation scheme.

Throughout, we will restrict our consideration to the equal-gain two-ray profile $$p(t) = \frac{1}{2}[\delta(t) + \delta(t - 2\Delta)]. \tag{8}$$

In this case, we have L=2, $\mu_d=\Delta$ and d=$\Delta$/T. In addition, note that at a specific time delay $t_l$ the channel impulse response, denoted by $h(t_l)$, is a complex zero-mean Gaussian random variable with variance $p(t_l)$.

Now by combining Equations (1) and (4) and using the convolutional integral, the received signal, which will be denoted as r(t), can then be expressed as $$r(t) = \sum_{k=1}^{K} \sum_{l=1}^{L} \sqrt{2P} \beta_l b_k(t - \tau_l) a_k(t - \tau_l) \cos(\omega_c t + \phi_l) + n(t) \tag{9}$$

where n(t) is the channel noise which is assumed to be a white Gaussian noise process with double sided power spectral density No/2.

ERROR PERFORMANCE ANALYSIS

Without loss of generality, we shall restrict our consideration to the 1st low-rate data stream. Further, we will assume that the desired receiver can coherently recover the carrier phase and delay lock to the jth path of the arriving desired signal. Therefore, if we let $Z_j$ denote the output of the correlator receiver that is matched to the jth path of data stream 1. (When there are more than 2 significant paths, a Rake receiver structure with multiple correlators must be considered.) Then, the decision statistic is given by (assuming that the maximum delay difference is less than two symbols)

$$Z_j = \int_{T_j}^{T+\tau_j} r(t) a_i(t - \tau_j) \cos(\omega_c t + \phi_j) dt \tag{10}$$

$$= \eta + \sqrt{\frac{P}{2}} T b_0^{(1)} \beta_j +$$

$$T\sqrt{\frac{P}{2}} \sum_{l=1; l \neq j}^{L} \beta_l \cos(\phi_l - \phi_j) \left[ b_{m-1}^{(1)} R_1^{(1)}(t_l + mT) + b_m^{(1)} \hat{R}_1^{(k)}(t_l + mT) \right] +$$

$$T\sqrt{\frac{P}{2}} \sum_{k=2}^{K} \sum_{l=1}^{L} \beta_l \cos(\phi_l - \phi_j) \left[ b_{m-1}^{(k)} R_1^{(k)}(t_l + mT) + b_m^{(k)} \hat{R}_1^{(k)}(t_l + mT) \right]$$

$$= \eta + \sqrt{\frac{P}{2}} b_0^{(1)} T \beta_j + T\sqrt{\frac{P}{2}} \sum_{l=1; l \neq j}^{L} x_l^{(1)} + T \sum_{k=2}^{K} \sum_{l=1}^{L} \sqrt{\frac{P}{2}} x_l^{(k)}$$

where $t_l = \tau_l - \tau_j$ and m=0 or 1 depending on whether $t_l \geq 0$ or $t_l < 0$. Likewise, $$\eta = \int_0^T n(t) a_1(t - \tau_j) \cos(\omega_c t + \phi_j) dt \tag{11}$$

-continued $$R_1^{(k)}(\tau) = \int_0^\tau a_k(t - \tau) a_1(t) dt \text{ and} \tag{12}$$

$$\hat{R}_1^{(k)}(\tau) = \int_\tau^T a_k(t - \tau) a_1(t) dt$$

for $0 \leq \tau < T$ and k=1, 2, ..., K. It can be easily shown that the continuous-time partial correlation functions defined in (12) can be expressed as $$R_1^{(k)}(\tau) = C_1^{(k)}(l-N)T_c + [C_1^{(k)}(l+1-N) - C_1^{(k)}(l-N)] \times (\tau - lT_c)$$

and $$\hat{R}_1^{(k)}(\tau) = C_1^{(k)}(l)T_c + [C_1^{(k)}(l+1) - C_1^{(k)}(l)] \times (\tau - lT_c)$$

where $l = \lfloor \tau/T_c \rfloor$ and $C_1^{(k)}(l)$ is the aperiodic cross-correlation function. That is, $$C_1^{(k)}(l) = \begin{cases} \sum_{j=0}^{N-1-l} a_j^{(k)} a_{j+l}^{(1)} & 0 \leq l \leq N-1 \\ \sum_{j=o}^{N-1+l} a_{j-l}^{(k)} a_j^{(1)} & 1-N \leq l < 0 \end{cases} \tag{13}$$

and $C_1^{(k)}(l) = 0$ for $|l| \geq N$. Also note that since n(t) is a white noise Gaussian process, it follows that $\eta$ is a zero mean Gaussiani random variable with variance $N_o T/4$.

Now let $P_e$ denote the system BER for the first low-rate data stream. Then $$P_e = \frac{1}{2} P(Z_j < 0 | b_0^{(1)} = +1) + \frac{1}{2} P(Z_j \geq 0 | b_0^{(1)} = -1). \tag{14}$$

Due to the symmetry of the problem, one can without loss of generality set $b_o^{(1)} = -1$. Hence, $P_e = P(Z \geq 0 | b_o^{(1)} = -1)$. Specifically, (for simplicity, we will omit the conditioning on $b_o^{(1)}$ in our notation)

$$P_e = Pr(\sqrt{\frac{P}{2}} T \beta_j \leq \eta + T\sqrt{\frac{P}{2}} \sum_{l=1; l \neq j}^{L} x_l^{(1)} + T\sqrt{\frac{P}{2}} \sum_{k=2}^{K} \sum_{l=1}^{L} x_l^{(k)}) \tag{15}$$

where $$x_l^{(k)} \triangleq \frac{1}{T} \beta_l \cos(\phi_l - \phi_j) \left[ b_{m-1}^{(k)} R_1^{(k)}(t_l + mT) + b_m^{(k)} \hat{R}_1^{(k)}(t_l + mT) \right]$$

for l=1, 2, ..., L and k=1, 2, ..., K. Next let $$S \triangleq \sum_{l=1; l \neq j}^{L} x_l^{(1)} \tag{16}$$

denote the desired user "self" interference, and $$C \triangleq \sum_{k=2}^{K} \sum_{l=1}^{L} x_l^{(k)} \tag{17}$$

denote the total co-channel interference. Likewise, let the random vector $\Theta = (B, D, \Phi, b)$ where $B = (\beta_1, \beta_2, \ldots, \beta_K)$, $D = (\tau_1, \tau_2, \ldots, \tau_K)$, $\Phi = (\phi_1, \phi_2, \ldots, \phi_K)$, and $b = (b_1, b_3, \ldots, b_K)$ where $b_k = (b_{m-1}^{(k)}, b_m^{(k)})$ for k=1,2, ..., K and m=0 or 1 again depending on whether the delay difference, $t_l$, is positive or negative as described above. Then, for a given $\Theta$ (with $b_o^{(1)}=-1$) the decision statistic $Z_j$ is conditionally Gaussian. In particular, $$P_e = \int \ldots \int_\Theta P_e(\theta) f_\Theta(\theta) d_\Theta$$

where $f_\Theta(\theta)$ is the joint probability "density" function of $\Theta$ (Note that the term "density" is being used in a loose statistical sense as the random vector $\theta$ contains discrete and continuous random variables.) and $$P_e(\theta) = Pr(\text{error} | \Theta = \theta) \quad (19)$$

$$\equiv Pr\left(\eta \geq T\sqrt{\frac{P}{2}}(\beta_j - (S+C))\right)$$

$$= Q\left[\sqrt{\frac{2E_b}{N_0}}(\beta_j - (S+C))\right]$$

where $E_b = PT$ is the energy per bit. Notice that if $\beta_l = 1$ for all $l$ and $K = L = 1$, then we have no self nor co-channel interference and Eqn. (19) reduces to the well-known BPSK result over the additive White Gaussian noise (AWGN) channel, $$Q\left[\sqrt{\frac{2E_b}{N_0}}\right],$$

where $Q[.]$ is the complementary error function.

The probability of error as expressed in Equation (18) cannot be in practical situations evaluated analytically. As a result, Monte Carlo simulations must be often used to estimate $P_e$. Let $I_e(Z_j)$ denote the indicator random variable of the error event $\{Z_j \geq 0\}$. That is, $I_e(Z_j) = 1$ if $Z_j \geq 0$. Otherwise, $I_e(Z_j) = 0$. Then the Monte Carlo estimator for $P_e$, $\hat{P}_e$, is the sample mean estimator which simply counts the relative frequency of the event $\{Z_j \geq 0\}$ during N independent simulation trials and then estimates $P_e$ as follows $$\hat{P}_e = \frac{1}{N}\sum_{n=1}^{N} I_e(Z_j^{(n)}) \quad (20)$$

where $Z_j^{(1)}, Z_j^{(2)}, \ldots, Z_j^{(N)}$ are N independent and identically distributed (iid) random samples that are generated during the simulation trials. The Monte Carlo estimator as described in Equation (20) often requires a large number of simulation trials. This is especially true when the BERs are relatively small. A more efficient approach for estimating $P_e$ can be obtained if one uses Eqns. (18) and (19). Indeed, notice that $$\hat{P}_e \equiv \frac{1}{N}\sum_{n=1}^{N} P_e(\Theta^{(n)}) \quad (21)$$

where $P_e(\Theta^{(n)})$ is given by (19) and $\Theta^{(n)}$ for $n=1,2,\ldots,N$ are iid random samples from $f_\Theta(\theta)$. Clearly, the computational cost required to achieve accurate estimates of $P_e$ can be significantly decreased through the use of Equation (21) instead of Equation (20).

Now it is clear that the overall system performance is dependent on the choice of the signature sequences. Traditionally, PN sequences such as m-sequences, Kasami sequences, or Gold codes have been used in spread-spectrum multiple access communications to separate the multiple users. However, in this application the low-rate data streams are transmitted synchronously. As a result, since orthogonal sequences such as Walsh codes have zero cross-correlations when they are time synchronized, one would expect that orthogonal signature sequences can be applied in multicode modulation. But, because multipath delays can introduce significant non-zero cross-correlations between the orthogonal codes another choice of signature sequences may be more appropriate. A possible alternative is to use a combination of orthogonal codes and PN sequences. Specifically, the symbol sequences for the K data streams can be multiplied by the same PN code and then separated by different orthogonal sequences. By doing so, the randomness for the orthogonal codes is increased while at the same time their zero cross-correlation property is maintained at zero time delay. Thus, the signature sequence $a_j^{(k)}$ can be for example, an orthogonal sequence (eg Walsh codes), or an orthogonal sequence multiplied or "concatenated" by a PN code which is the same for all data streams.

NUMERICAL RESULTS

In this section, some sample numerical results are presented which illustrate the potential of the proposed multicode modulation method of the present invention as applied to the transmission of high bit rates in wireless personal communications. Throughout, we will use as an example a bit rate $R_b = 10$ Mbps. Hence, the low information rate of the parallel data streams is simply $R = 10/K$ Mbps. Recall that our results are specific to the $L=2$ delay profile given by Equation (8). However, we note that it has been shown that the performance of various communications systems over multipath fading channels is not very sensitive to the delay profile used. In fact, if $L \geq 2$ and if a Rake receiver with maximum ratio combining among the various signals from multiple correlators is considered, better results may be obtained at the expense of higher complexity. Finally, we notice that in this study we have restricted our consideration to the high signal-to-noise (SNR) or the irreducible BER performance. In other words, our main interest is the "irreducible" bit errors which occur at very high SNRs. These errors typically occur because of signal fading and/or ISI caused by multipath delay spread.

Figure 2:
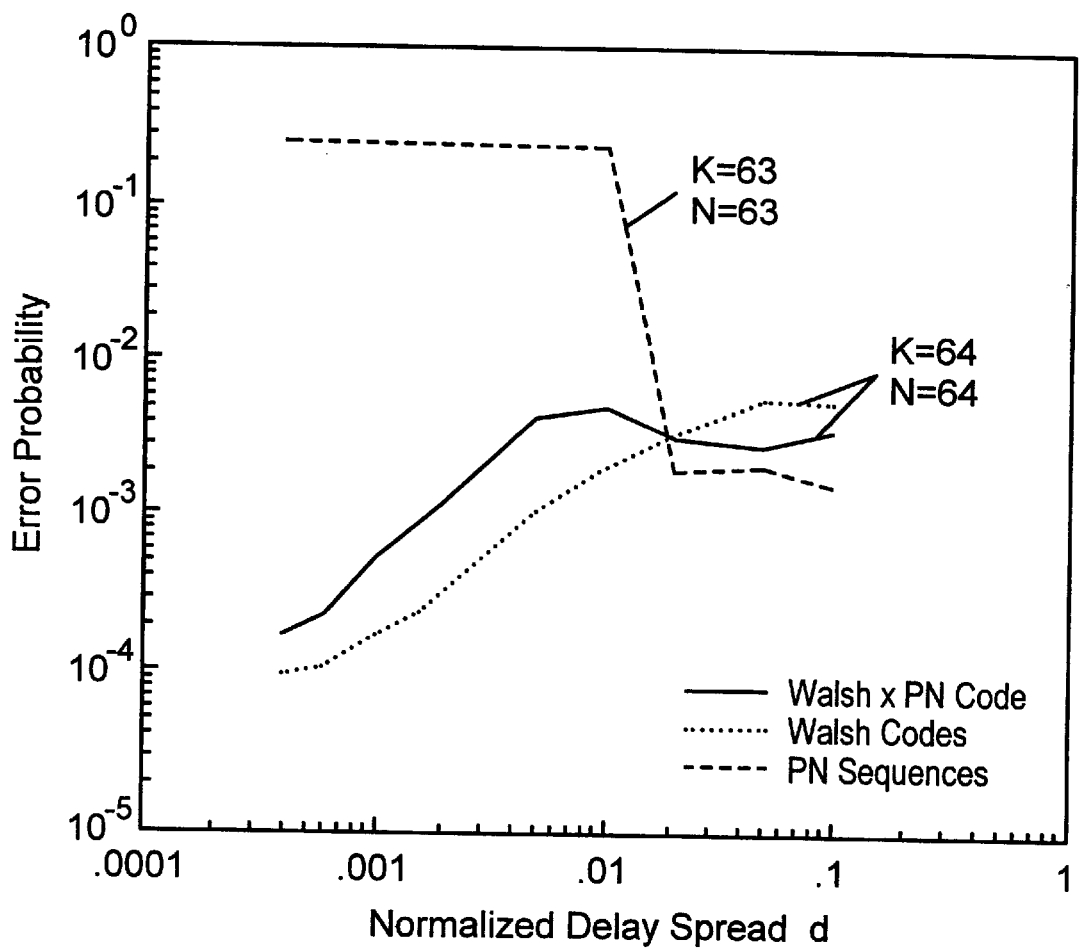
FIG. 2 shows the BER performance of the present invention as a function of the normalized delay spread.

FIG. 2 lists the BER performance of the proposed multicode modulation scheme as a function of the normalized delay spread d when $E_b/N_o = 40$ dB. Specifically, this figure lists the average bit error probability using Walsh sequences with $K=N=64$, m-sequences with period $N=63$ along with 63 low-rate parallel data streams, and $K=64$ Walsh sequences that are multiplied or concatenated with the first 64 bits of an m-sequence with length 127. A close observation of this figure clearly indicates the potential of the method of the present invention for the transmission of high-speed data. For example, note that when $d=0.1$ we have $R_b = 1/T_c = 0.1 \times 10^8$, $R = 0.1562 \times 10^6$, and $\Delta = 0.64 \times 10^{-6} = 640$ nsec, which is approximately the upper bound of the normalized rms delay spread in the personal communications environment. For comparison, it is noted that with this value of $\Delta$ the normalized rms delay spread is equal to 6.4 when $K=1$ (i.e., over a single user channel). Obviously, the transmission over the channel with small error rates in this latter case is impossible unless one uses an alternative modulation scheme such as the one proposed here.

Figure 3:
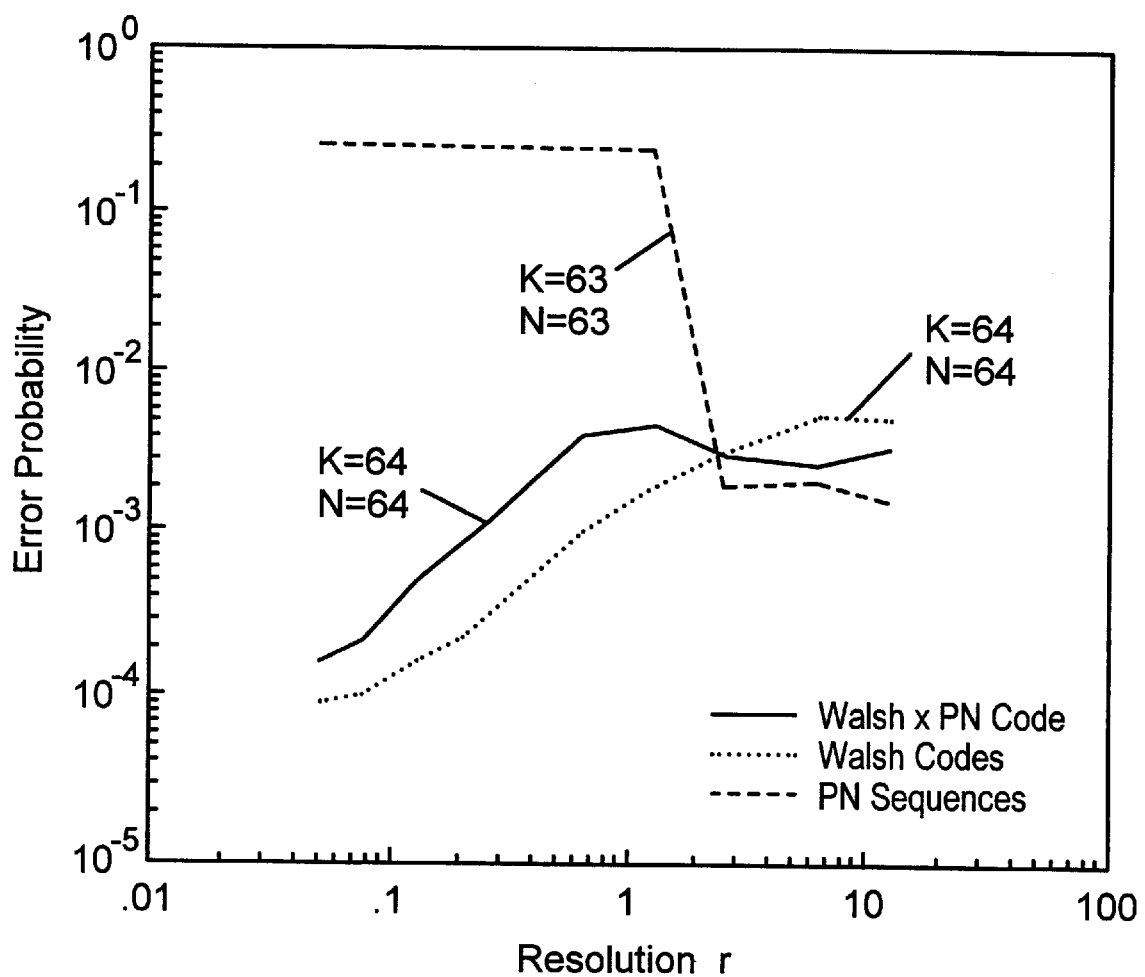
FIG. 3 shows the BER performance of the present invention as a function of the spread spectrum resolution.

The importance of selecting appropriate signature sequences is also clearly indicated in FIG. 2. Specifically, note that for large delay spreads the PN sequences give the best performance. However, when the delay spread is relatively small multicode modulation with PN sequences is unusable. In contrast, note that the orthogonal Walsh sequences give the best and worst performance among the three considered codes for small values and large values of d, respectively. Finally, note that the performance of the concatenated Walsh/m-sequences is a compromise of the above coding schemes. This can be easily explained by presenting FIG. 3 which shows the BERs listed in FIG. 2 as a function of the DS spread-spectrum modulation "resolution" which we will define as $$r = 2\Delta/T_c \qquad (22)$$

Clearly, the performance of the PN sequences is expected to be very bad for values of $r \leq 1$ since in this case the delayed paths cannot be resolved. For these values, the time delays are relatively small. As result, the orthogonal walsh functions will give the best performance because of their small cross-correlations which makes the co-channel interference nearly zero. In contrast, for large values of d the non-zero cross-correlations of Walsh sequences are not negligible. Consequently, the performance of multicode modulation with Walsh codes is worse than that with PN sequences. Finally, note that the concatenated walsh/PN-sequences combine the good features of orthogonal codes as well as PN sequences. Specifically, they solve the cross-correlation problem of the Walsh codes when the delay spread is large and maintain the "orthogonality" property of the Walsh sequences when the delay spread is small.

Figure 4:
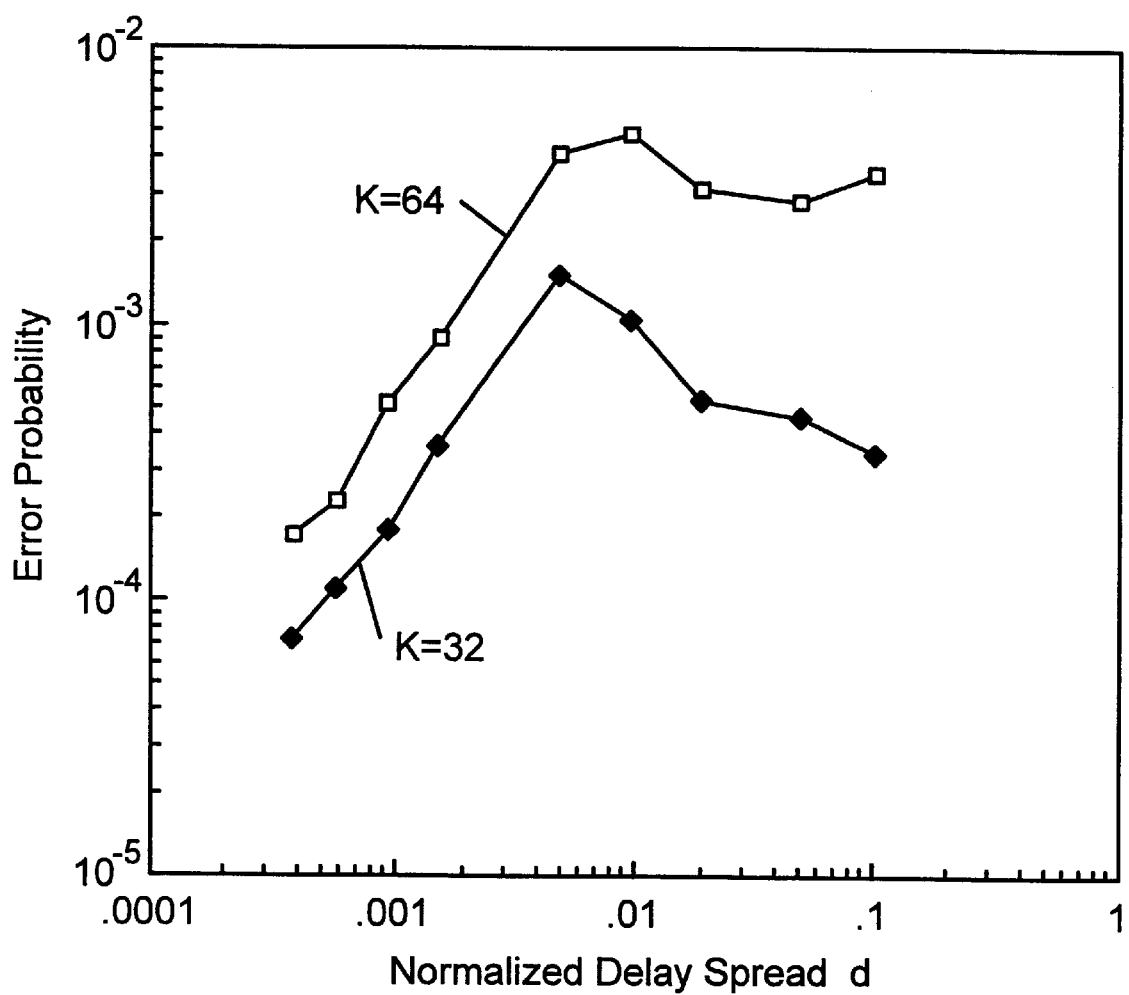
FIGS. 4 and 5 show the BER performance of the present invention as a function of the normalized delay spread and for different numbers of low-rate bit streams.
Figure 5:
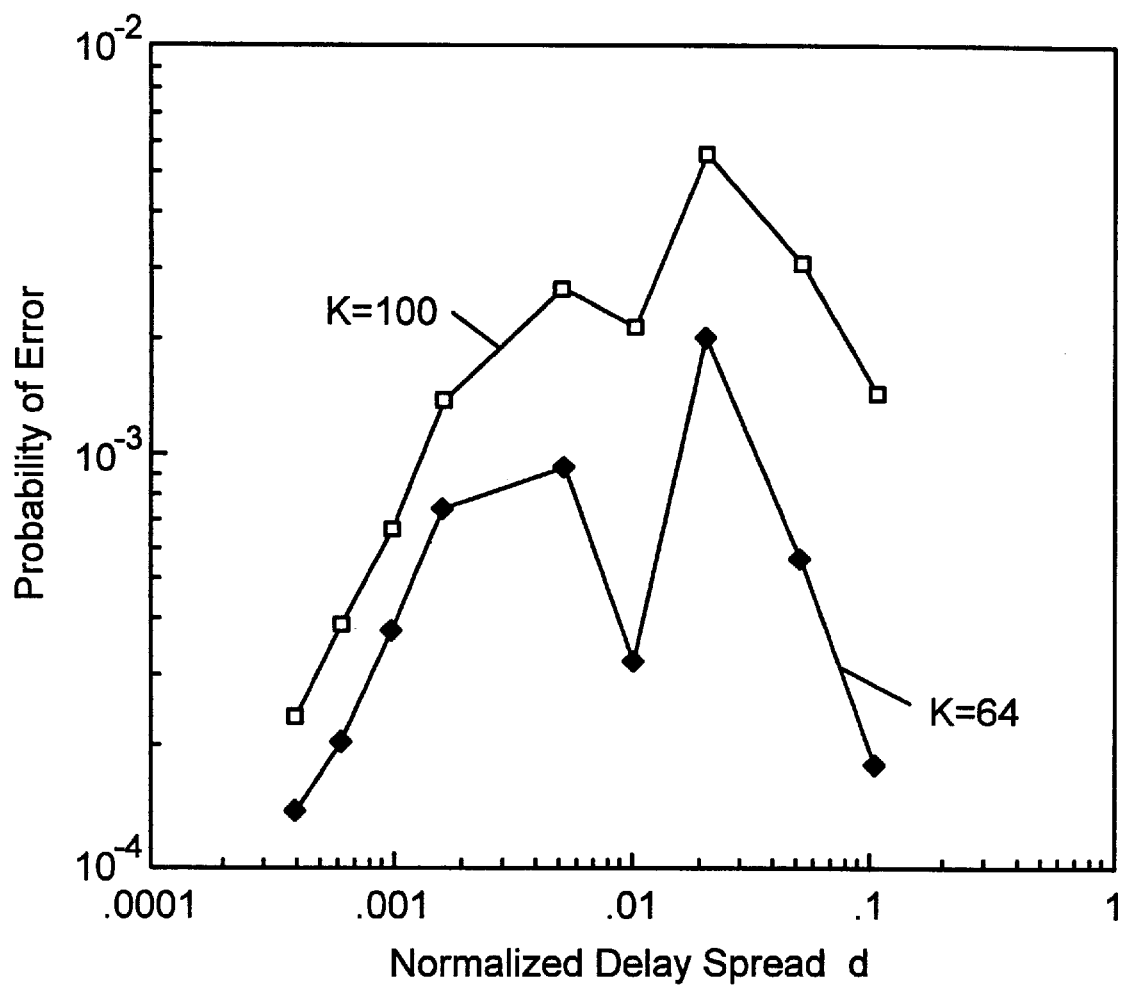

Now note that the performance of the multicode modulation method is not as good as one would hope for. This is expected because the performance of the system over a single Rayleigh faded path (i.e., with K=L=1) is poor to begin with. Indeed, in this case our simulations predict that $P_e = 0.23 \times 10^{-5}$. By using a fully loaded spread spectrum system (i.e., a DS spread spectrum where the total number of simultaneous users is equal to K) one would expect that the performance would degrade and becomes relatively poor. One possible solution is to use less low-rate parallel data streams as shown in FIG. 4. This will clearly improve the system performance (as there will be less co-channel interference) at the expense of the channel bandwidth usage. This is also illustrated in FIG. 5 which shows the average error probability against d when Walsh codes with N=128 are concatenated with the first 128 chips of an m-sequence with period 255.

Figure 6:
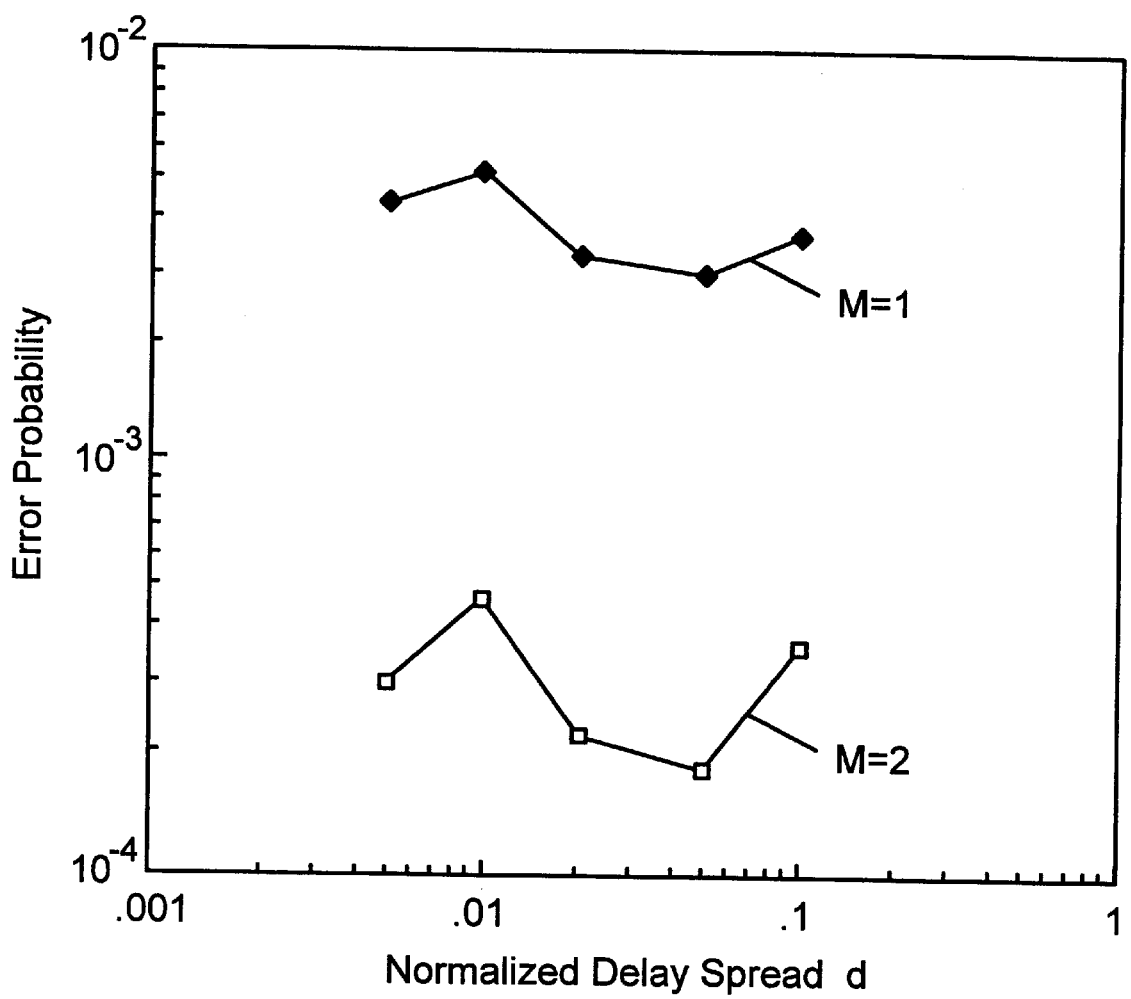
FIG. 6 shows the effect on BER of selection diversity.

The performance of spread spectrum multiple-access over multipath fading channels can be significantly improved if one employs some type of diversity such as Selection diversity or Maximal Ratio Combining diversity. This is illustrated in FIG. 6 which lists the BER performance when antenna selection diversity of order M=2 is used. It was also found that performance among sub-channels is different, ie "code-selective" fading exists, similar to frequency-selective fading that occurs in the multicarrier modulation. It is therefore expected that coding and interleaving could help reduce the associated bursty errors.

Figure 7:
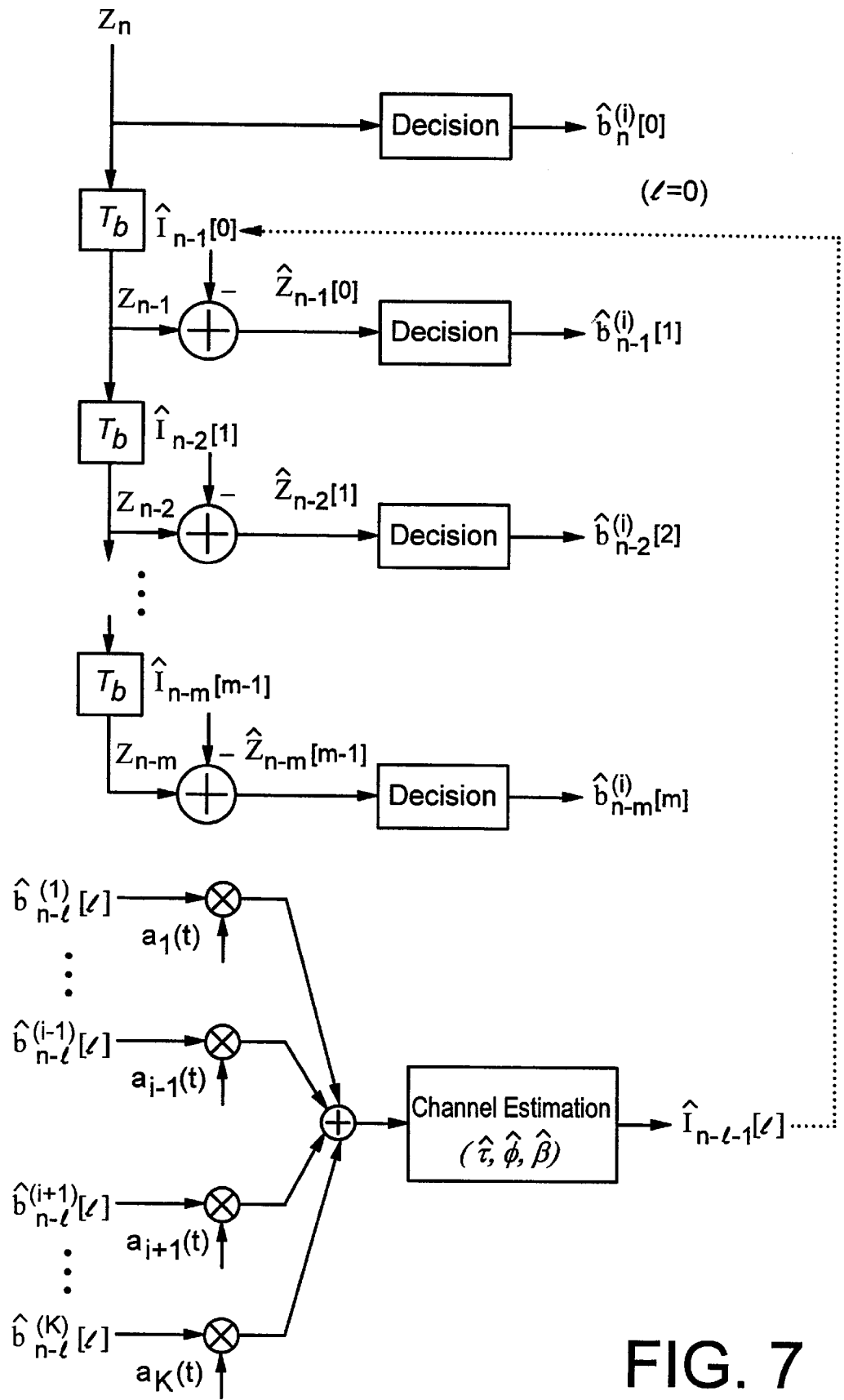
FIG. 7 illustrates a proposed interference cancellation method.

The results presented here indicate that multicode modulation can indeed be a potential candidate for high-speed transmission. To further improve the system performance and because of the special structure of multicode modulation one can cancel the interference among the sub-channels using an interference cancellation method. The proposed interference cancellation method is based on a successive co-channel interference cancellation scheme whose aim is to improve the system performance by incorporating the available information about the interference signals in the decision process. This is done by regenerating estimates of the interfering signals, and then subtracting those reconstructed interference signals from the input of the desired receiver. This process is performed in a cascaded fashion in such a way that more and more of the interference signals are cancelled, thereby resulting in a significant performance improvement. This process is performed successively (i.e., in multiple stages) as follows (See FIG. 7).

We first find initial estimates of the co-channel interference terms (stage O). We will then proceed with m stages of processing the decision statistics of the desired signal. At the l stage, we reconstruct the co-channel interference terms $\hat{I}_n[l]$ where n denotes the index of the nth bit interval using estimates of the channel (namely, the multipath time delay $\hat{\tau}$, please delay $\hat{\phi}$, and path gain $\hat{\beta}$) along with estimates of the unknown transmitted symbols of data stream k, $\hat{b}_n^{(k)}$ and then subtract the regenerated co-channel interference for the desired data stream received signal to obtain a new decision statistic for the lth stage. Ideally, if we can correctly estimate the co-channel interference terms at say stage l, then the decision statistic at the next stage will not include any co-channel interference terms. Consequently, significant improvement in the system performance would result. On the other hand, note that if the data estimation for say data stream k is incorrect at say stage l, then a negative version of the interference caused by this data stream is created, thereby, resulting in a new co-channel interference term (due to data stream k) at the l+1 stage that is twice the co-channel interference term of data stream k at stage l. It is therefore clear that one must have relatively good data and channel estimates in order for this iterative scheme to work well. However, note that because of the special structure of the multicode modulation system, there is only one channel for all the data streams. Hence, we only need to estimate the channel parameters once. This can be done for instance by allocating a pilot channel for that purpose. Further, notice that the signature sequences, $a_k(t)$, of all the data streams are known. Hence, it is reasonable to expect that the proposed interference cancellation method to perform well in the multicode modulation system. Such performance improvement has been actually observed and was found to be true during various simulations that have been conducted.

We claim:

1. A method for transmitting digital data in a wireless communication environment comprising:
    dividing an incoming stream of serial data bits having a first bit duration ($T_b$) into a plurality (K) of parallel data bit streams;
    expanding by K times the bit duration of the incoming data so that the resulting symbol duration in said parallel data streams equals $KT_b$;
    modulating said expanded parallel data streams with modulating sequences, each said modulating sequence having a processing gain N, having a sequence period equal to the symbol duration $KT_b$ of said expanded data streams, and having N binary chips within each period so that each chip has a chip duration of $T_c = KT_b/N$, wherein K and N are integers and N>K; and
    summing the modulated parallel data streams for transmission.

2. A method according to claim 1, wherein said modulating sequences are mutually orthogonal.

3. A method according to claim 1, wherein said modulating sequences are pseudo-noise (PN) sequences.

4. The method of claim 3, wherein said PN sequences are selected from the group comprising m-sequences, Kasami sequences and Gold sequences.

5. A method according to claim 1, wherein each said modulating sequence is a combination of a pseudo-noise sequence and an orthogonal sequence.

6. A method according to claim 5 wherein said combination is formed by multiplication or concatenation.

7. A method according to claim 1, wherein the system performance is adjustable by varying the ratio of K to N.

8. A method according to claim 1, further including the step of inserting a pilot channel with data unrelated to the incoming data stream alongside the expanded parallel data streams, for estimating channel parameters.

9. A method according to claim 1, wherein the summed parallel data streams are transmitted using a single carrier.

10. A device for transmitting digital data in a wireless communication environment comprising:

a serial to parallel converter for dividing an incoming stream of serial data bits having a first bit duration ($T_b$) into a plurality (K) of parallel data bit streams;

means for expanding by K times the bit duration of the incoming data so that the resulting symbol duration in said parallel data streams equals $KT_b$;

a modulator for modulating said expanded parallel data streams with modulating sequences, each said modulating sequence having a processing gain N, having a sequence period equal to the symbol duration $KT_b$ of said expanded data streams, and having N binary chips within each period so that each chip has a chip duration of $T_c=KT_b/N$, wherein K and N are integers and N>K; and a summing device for summing the modulated parallel data streams for transmission.

11. A device according to claim 10, wherein said modulating sequences are mutually orthogonal.

12. A device according to claim 10, wherein said modulating sequences are pseudo-noise (PN) sequences.

13. A device according to claim 10, wherein each said modulating sequence is a combination of a pseudo-noise sequence and an orthogonal sequence.

14. A device according to claim 13 wherein the said combination is formed by multiplication or concatenation.

15. A device according to claim 10, wherein the system performance is adjustable by varying the ratio of K to N.

* * * * *

UNITED STATES PATENT AND TRADEMARK OFFICE
CERTIFICATE OF CORRECTION

| | | |
|---|---|---|
| PATENT NO. | : 5,960,032 | |
| APPLICATION NO. | : 08/531012 | |
| DATED | : September 28, 1999 | |
| INVENTOR(S) | : Khaled B. Letaief et al. | |

It is certified that error appears in the above-identified patent and that said Letters Patent is hereby corrected as shown below:

TITLE PAGE, ITEM (56)

In the second column of the front page of the issued patent, after the line reading "5,615,227  3/1997  Schumacher, Jr. et al. .......... 375/206", please add the following line: "5,668,806  9/1997  Arai et al. ................. 370/342".

Signed and Sealed this

Seventeenth Day of May, 2011

David J. Kappos
*Director of the United States Patent and Trademark Office*